(12) United States Patent
Mascaró Hereza et al.

(10) Patent No.: US 11,005,151 B2
(45) Date of Patent: May 11, 2021

(54) RADOME FOR VEHICLES AND METHOD FOR MANUFACTURING SAID RADOME

(71) Applicant: ZANINI AUTO GRUP, S.A., Parets Del Valles (ES)

(72) Inventors: Marçal Mascaró Hereza, Barcelona (ES); Miquel Casanovas Cejuela, Barcelona (ES); José Sanahuja Clot, Barcelona (ES); Marc Bover Balderich, Barcelona (ES); Augusto Mayer Pujadas, Barcelona (ES)

(73) Assignee: Zanini Auto Grup, S.A., Barcelona (ES)

( * ) Notice: Subject to any disclaimer, the term of this patent is extended or adjusted under 35 U.S.C. 154(b) by 32 days.

(21) Appl. No.: 16/556,748

(22) Filed: Aug. 30, 2019

(65) Prior Publication Data

US 2020/0072970 A1 Mar. 5, 2020

(30) Foreign Application Priority Data

Aug. 30, 2018 (EP) .................................. 18382634

(51) Int. Cl.
*H01Q 1/02* (2006.01)
*H01Q 1/32* (2006.01)
(Continued)

(52) U.S. Cl.
CPC ............. *H01Q 1/02* (2013.01); *H01Q 1/3233* (2013.01); *H01Q 1/3283* (2013.01);
(Continued)

(58) Field of Classification Search
CPC ...... H01Q 1/02; H01Q 1/3233; H01Q 1/3283; H01Q 1/422; H01Q 1/425; H01Q 1/42;
(Continued)

(56) References Cited

U.S. PATENT DOCUMENTS

| 5,806,957 A | 9/1998 | Prior et al. |
| 2004/0080958 A1 | 6/2004 | Bukosky et al. |

(Continued)

FOREIGN PATENT DOCUMENTS

| DE | 102014002438 A1 * | 8/2015 | ........... H01Q 1/3283 |
| DE | 102014002438 A1 | 8/2015 | |

(Continued)

OTHER PUBLICATIONS

Office Action for U.S. Appl. No. 16/344,351, dated Aug. 18, 2020, 10 pages.
(Continued)

*Primary Examiner* — Raymond R Chai
(74) *Attorney, Agent, or Firm* — Danielson Legal LLC

(57) ABSTRACT

The radome for vehicles includes a frontal layer (1) and a rear layer (2), both made from thermoplastic material, and it also includes a heating element (3) placed on the frontal layer (1), on its face opposed to the rear layer (2). The method for manufacturing the radome includes forming the frontal layer (1) with the heating element (3) placed on a face of the frontal layer (1); placing the conductive element(s) (5) in the heating element (3); forming the rear layer (2); assembling the frontal and rear layers (1, 2), so that the heating element (3) is on the face of the frontal layer (1) opposite to the rear layer (2). Some embodiments provide a radome with a heating function and an outstanding appearance.

12 Claims, 1 Drawing Sheet

(51) Int. Cl.
*H01Q 1/42* (2006.01)
*G01S 13/931* (2020.01)
*G01S 7/40* (2006.01)

(52) U.S. Cl.
CPC ............. *H01Q 1/422* (2013.01); *H01Q 1/425* (2013.01); *G01S 13/931* (2013.01); *G01S 2007/4047* (2013.01); *G01S 2013/93271* (2020.01)

(58) Field of Classification Search
CPC ..... G01S 2013/93271; G01S 2013/931; G01S 2007/4047; G01S 2007/027; G01S 7/02
See application file for complete search history.

(56) References Cited

U.S. PATENT DOCUMENTS

| | | | |
|---|---|---|---|
| 2008/0063874 A1 | 3/2008 | Rakow et al. | |
| 2008/0149318 A1* | 6/2008 | Dakhoul | F28F 3/086 165/167 |
| 2008/0309579 A1 | 12/2008 | Maeda et al. | |
| 2012/0119961 A1 | 5/2012 | Pujadas | |
| 2012/0320615 A1 | 12/2012 | Englert | |
| 2017/0352938 A1* | 12/2017 | Okumura | G01S 7/02 |
| 2017/0357044 A1 | 12/2017 | Kuramitsu et al. | |
| 2018/0090832 A1 | 3/2018 | Takahashi et al. | |
| 2018/0170314 A1* | 6/2018 | Paule | G01S 7/4004 |
| 2018/0254551 A1 | 9/2018 | Guretzky et al. | |
| 2018/0287252 A1* | 10/2018 | Nicke | H05K 1/028 |
| 2020/0144693 A1* | 5/2020 | Mayer Pujadas | H01Q 1/42 |

FOREIGN PATENT DOCUMENTS

| | | | | |
|---|---|---|---|---|
| JP | 2018066705 A | * | 4/2018 | ........... G01S 13/931 |
| JP | 2018066705 A | | 4/2018 | |

OTHER PUBLICATIONS

Office Action for U.S. Appl. No. 16/344,351, dated Dec. 30, 2020, 10 pages.

Office Action for U.S. Appl. No. 16/474,230, dated Jun. 12, 2020, 13 pages.

European search report for EP18382634, dated Feb. 27, 2019, 2 pages.

* cited by examiner

RADOME FOR VEHICLES AND METHOD FOR MANUFACTURING SAID RADOME

CROSS-REFERENCE TO RELATED APPLICATIONS

The present application claims the benefit of and priority to European Patent Application No. 18382634.6, filed on Aug. 30, 2018, the entire disclosure of which is incorporated by reference as if set forth in its entirety herein.

The present invention refers to a radome for vehicles, such as a decorative radome used as an emblem which possesses a metallic image, especially for radomes disposed in front of a radar in the front grill of a vehicle, integrating heating capability. The present invention also refers to a method for manufacturing said radome.

BACKGROUND OF THE INVENTION

Vehicles with sensors able to sense their surroundings are the key enablers to decrease of road fatalities. Through sensors, driver assistance functions are implemented, minimizing risks and increasing the probability of avoiding collisions.

Vehicles are designed to offer an aesthetically pleasant impression. Therefore, sensors must be integrated within the vehicle behind covers enabling their function, concealing them from the public view and harmonized with the aesthetic design of the vehicle.

In case of a radar sensor, such covers are known as radomes. As mentioned above, radomes must minimize the impact its presence offers to radar emitted and received waves. This is especially important in adverse weather conditions, when driving becomes more dangerous due to loss of visibility, road ground conditions and other. Obviously, water, ice and snow represent a clear danger for the functionality of the radar, as they block radar waves and can be deposited over the radome surface.

Hence, radomes must be able to remove such layers, for instance, melting them. Integrating a heating capability in a decorative radome is a difficult task given the complexity of the design, the different materials employed, and the decoration technologies required to faithfully reproduce a brand logo.

There are several inventions where the use of heating has been disclosed for automotive radomes.

DE 19724320 A1 disclose the arrangement of electrical conductor tracks in a curved dielectric body, so that the conductive structure does not lie in one plane. This document does not provide a solution for the manufacturing of the radome, only a concept that would need to be produced.

DE 2017055182 A1 discloses a flexible printed circuit board that is injection molded with a thermoplastic. Circuit tracks are used to transport current instead of conductive wires. Electrical contact elements are present in the board so that a plug-in basket can make contact with them.

Main limitation of this invention comes from the fact of employing circuit tracks, as the performance of a radome using this technology is significantly worse than using conductive wires.

DE 10156699 A1 discloses conductor paths that are applied to the rear surface of a plastic part representing a brand logo, which in turn is attached to a second plastic part so the conductor paths are sandwiched between both plastic materials.

The issue is distance between conductor paths and the front surface, where ice or snow will deposit and will need to be removed.

US 20060086710 A1 discloses a film embedding conductor strips placed in the inner surface of a polymeric part. A control unit regulates the amount of current circulating through the strips, thus controlling the heating output. Here again, the issue is distance between conductive elements and the front surface, where ice or snow will deposit and will need to be removed.

DE102014002438 A1 discloses a process for manufacturing a heatable radome, in which a thin foil with recesses embedding conductive wires is shaped and insert molded. Electric contact between an element and the wires is done at a recess in the film.

Although this solution may allow placing the foil on the outermost radome surface, thus optimizing heating transfer and efficiency, it lacks protection in the contact area. Therefore, metals at that point are subject to corrosion and degradations over time due to their exposure to the environment.

DE102013207482 A1 discloses a similar invention as in DE102014002438 A1, so the same limitations apply.

It has been shown the issues affecting design and manufacturing of heatable radome solutions. The aim of this invention is solving these problems while providing a pleasant aesthetic and functional solution that can be easily manufactured.

DESCRIPTION OF THE INVENTION

With the radome according to the present invention it is possible to solve said drawbacks, providing other advantages that are described below.

The radome for vehicles according to the present invention comprises a frontal layer and a rear layer, both made from thermoplastic material, and it is characterized in that the radome also comprises a heating element, such as e.g. a foil with conductive wires, placed on the frontal layer, on its face opposed to the rear layer.

Advantageously, the conductive wires are embedded in said foil.

Furthermore, the radome comprises a conductive element that is connected with the conductive wires of said foil, said conductive element being preferably placed in a recess made on the foil rear surface.

In the radome according to the present invention, the rear layer also comprises preferably a case for a connector, said case comprising a hole for placing a conductive pin.

According to two alternative embodiments, the conductive element is a pad or a base.

Furthermore, in the radome according to the present invention, both frontal and rear layers have indentations and protrusions complementary to each other, for optimizing the passage of radar waves through the radome and for defining the logo of the vehicle.

The frontal layer and/or the rear layer can also comprise a track placed along the whole periphery of the frontal layer, and/or a track placed circling the recess for said conductive element.

According to a second aspect, the present invention also refers to a method for manufacturing a radome for vehicles as described previously, characterized in that the method comprises the following steps:

forming the frontal layer with the heating element, such as e.g. a foil with conductive wires, placed on a face of the frontal layer;

placing the conductive element(s) in the heating element;
forming the rear layer;
assembling the frontal and rear layers, so that the foil is on the face of the frontal layer opposite to the rear layer.

The method according to the present invention can also comprise the steps of:
placing the conductive pin in said rear layer before assembly the frontal and rear layers; and/or
placing solderable tracks in said frontal and/or rear layers, the step of placing the conductive element in the frontal layer being made preferably by welding.

Furthermore, the formation of both frontal and rear layers is made preferably by injection of the thermoplastic material in a first and second tools.

The invention discloses a radome with a heating function and an outstanding appearance. Furthermore, the invention provides a simplified and robust process to connect the heating element of the radome to an electrical connector, which is typically located on the radome innermost surface, facing the vehicle engine.

To get optimum heating performance, the heating element is placed as close as possible to the outermost surface, where water, ice or snow may be accumulated.

In several inventions previously described, heating elements are placed on the rear surface of a frontal layer. The thermoplastic material acts as an insulator, so larger power needs to be dissipated by the heating element, in these cases, to reach a certain temperature, compared to the present invention, where the heating element is directly in the outermost surface.

The present invention also prevents corrosion on the electrical contact area where foil embedded heating wires are accessible, by:
having a recess on the rear surface of the frontal layer,
surrounding the recess with thermoplastic material,
filling the case in the rear layer with electrically conductive material,
removing direct access of air and water with the solderable track all around the area.

The invention also optimizes electrical contact between heating wires and connector pins by:
adding electrically conductive elements, such as pads or bases, to the wires accessible through the recess, so that mechanical stress on thin embedded wires is shifted to the more robust structure of the conductive elements,
filling the case with electrically conductive elements,
robustly attaching all elements (foil and frontal layer to rear layer) with laser welding.

BRIEF DESCRIPTION OF THE DRAWINGS

For a better understanding the above explanation and for the sole purpose of providing an example, some non-limiting drawings are included that schematically depict a practical embodiment.

DESCRIPTION OF PREFERRED EMBODIMENTS

Figure 1:
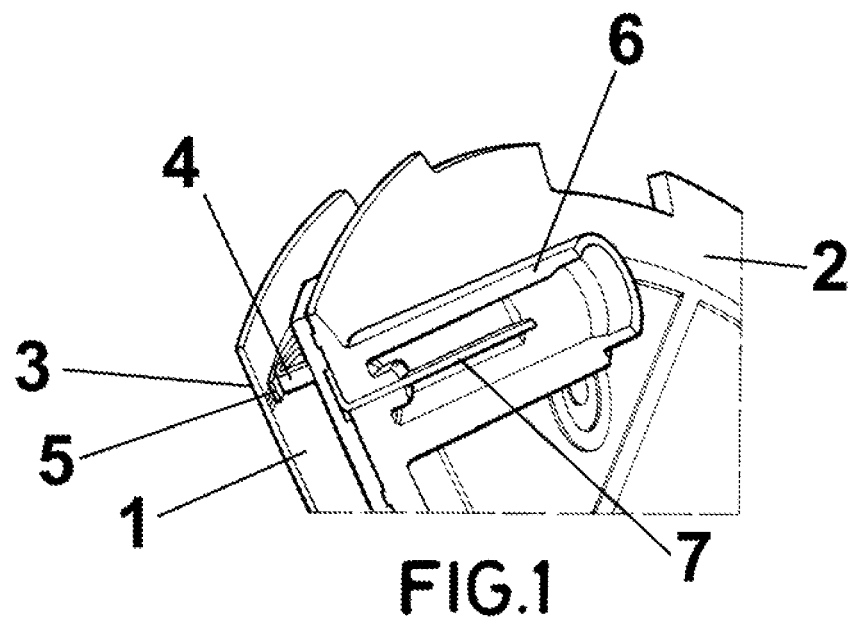
FIGS. 1 and 2 are section views showing a first embodiment of the radome for vehicles according to the present invention.
Figure 2:
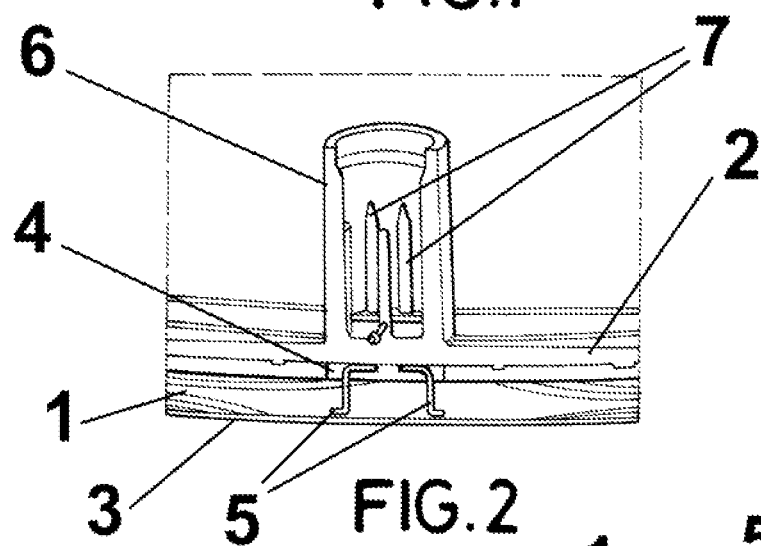

A first embodiment of the radome for vehicles according to the present invention is shown in FIGS. 1 and 2.

The radome comprises a frontal layer 1 and a rear layer 2 that are assembled to each other. Both layers are made form a thermoplastic material.

According to the present invention a heating element 3 is placed on the frontal surface of the frontal layer 1, i.e. in the external surface of the radome.

According to a preferred embodiment, this heating element 3 is a foil provided with a plurality of conductive wires, preferably embedded in the foil.

The heating element 3 comprises a recess 4 for housing a conductive element 5, that in this embodiment is a pad.

The rear layer 2 comprises a case 6 for a connector (not shown in the drawings) that is connected directly to the electric source of the vehicle. And this case 6 comprises a conductive pin 7 inside it that crosses the case and a part of the rear layer 2 by a hole.

Therefore, the connection from the connector to the heating element 3 is carried out by the pin 7 and the conductive element 5, so that electricity is passed from the connector to the conductive wires of the heating element 3.

It must be pointed out that in the drawings just one conductive element, case and pin are shown for simplicity reasons, but the radome according to the present invention can comprise any suitable number of conductive elements, cases and pins.

Furthermore, in the radome according to the present invention, both frontal and rear layers 1, 2 have indentations and protrusions complementary to each other, for optimizing the passage of radar waves through the radome and for defining the logo of the vehicle.

The frontal layer 1 and/or the rear layer 2 can also comprise preferably a solderable track placed along the whole periphery of the frontal layer, and/or a solderable track placed circling the recess for said conductive element 5. These conductive tracks are not shown in the drawings.

Figure 3:
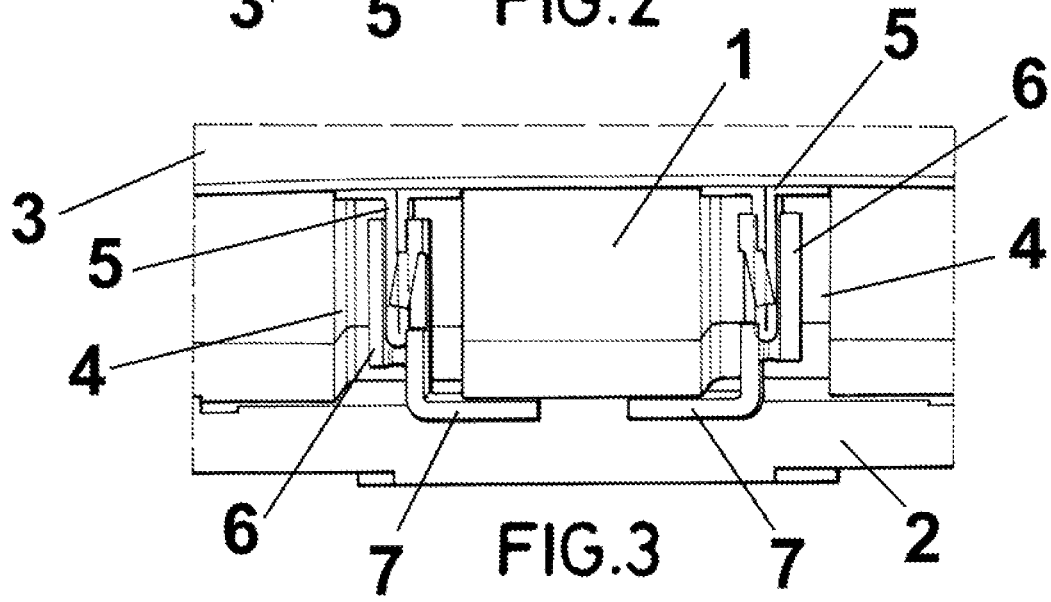
FIG. 3 is a section view showing a second embodiment of the radome for vehicles according to the present invention.

A second embodiment is shown in FIG. 3, which is very similar to the first embodiment. For simplicity reasons, the same numeral references are used for identifying the same or equivalent elements.

The main difference with respect to the first embodiment is that the conductive element 5 is a base, that is used as a base for a conductive pin 7.

To get optimum heating performance, the heating element 3 is preferably placed as close as possible to the outermost surface, where water, ice or snow may be accumulated.

As said previously, for placing the heating element 3 in the outermost surface of the radome, it is preferable using a plastic foil which embeds conductive wires in a sandwich configuration.

Wires could also be placed along the recess(es) 4 present in the frontal layer 1 and then over-injected with the rear layer 2. This would lead to a similar sandwich configuration, but the thickness of the frontal layer 1 would be larger than the foil thickness because of injection requirements.

The heating element 3 is fed from said connector, that is hidden by the emblem body itself. The connector is plugged to a cable coming from the vehicle power train, responsible of supplying the electric energy that will circulate through the heating element 3.

Electrical connection between the heating element 3, located in the radome outermost surface, and the connector, located in the radome innermost surface, must, therefore, be made as simple and reliable as possible.

According to the method of the present invention, the heating element 3 is inserted and molded in a first tool with a first thermoplastic material, for forming the frontal layer 1, with its rear surface being in direct contact with the front surface of the thermoplastic frontal layer 1.

The heating element 3 preferably partially covers the frontal surface of the frontal layer 1, even though it could be covered completely.

The frontal layer 1 has holes from its front to its rear surface at position of the recess 4, so that the conductive wires embedded in the heating element 3 are accessible from the rear surface of the frontal layer 1.

Once molding of the first part of the radome is finished, electrically conductive elements 5, such as, but not limited to, pads, are placed directly over the recess 4 and welded by ultrasounds, pressure, temperature or any other suitable means, to the accessible part of the embedded wires. Alternatively, the conductive element could be placed before the first injection.

Preferably, the pads are two, and it could be a maximum of two pads per the number of parallel circuits implemented in the heating element 3.

Each pair of pads account for the positive and negative electrical potential terminals needed for electrical current flow.

As stated previously, the frontal layer 1 has, also in its rear surface, two protruded or indented tracks, the first placed along the whole periphery, and the second placed circling the wire recess where the conductive pads are located.

These tracks are needed to assemble the frontal and rear layers 1, 2 together, e.g. by laser welding.

The rear layer 2 is injected in a second tool, with its front surface having indentations and protrusions complementary to the ones present in the rear surface of the first thermoplastic injected part. This is done to optimize the passing of radar waves through the radome.

The rear layer 2 also includes a case 6 to embed pins 7, as stated previously. The pins 7 will make electrical contact with a connector coming from the vehicle and the pins 7 will make electrical contact with the heating element 3 in the radome outermost surface.

Through this connection, the electrical energy will circulate from the vehicle power train to the radome outermost surface.

The case 6 contains holes that will fix the pin 7 position. The hole diameter is smaller than the pin 7 diameter, but large enough to allow the pin 7 edge to be introduced through it.

Pin 7 embedding can be made with a robot that will first place the pins 7 inside the case holes. Then the robot applies pressure enough on the pins 7 to trespass the rear layer 2 from the front to the rear surface. The pins 7 have a flat, wide area on the part protruding over the front surface of the rear layer 2.

As stated previously, the rear layer 2 also has, in its front surface, two protruded or indented tracks, complementary to those present in the first injected part rear surface, the first placed along the whole periphery, and the second placed around the pin case.

Once the frontal and rear layers 1, 2 have been manufactured as described previously, assembly between both parts takes place. Electrical contact between the conductive elements 5 and the pins 7 are made more robust by welding these components together. The pin area lying above the frontal surface of the rear layer 2 is immersed in an electrically conductive UV curable resin, or can be filled with an elastic foam, or any other suitable means that increases contact robustness between the conductive elements 5 and the pins 7. Therefore, longer lifespan for the radome can be achieved.

Furthermore, this resin or elastic foam fills the case space where both conductive elements 5 and pins 7 will be located, removing air, and highly decreasing the possibility of water ingress on the case. Thus, resistance to corrosion, which would eventually prevent electrical current to optimally circulate from the vehicle connector to the surface to be heated by attacking electrical conductive areas, is severely improved. Therefore, longer lifespan for the heated radome can be achieved.

Afterwards, both frontal and rear layers 1, 2 are aligned according to their indentations and protrusions. At the same time, recess 4 is aligned with the pin area.

Then, laser welding is applied along the track in the periphery, making contact between the rear surface of the frontal layer 1 and the frontal surface of the rear layer 2. Laser welding melts material from both parts, and then a single, solid radome block is obtained. Laser welding is also applied on the welding track surrounding the case 6, thus ensuring waterproofness in the electrical contact area.

Both frontal and rear layers 2 will then be attached. This will also lead to a certain amount of pressure between the pin 7 and the heating element wires accessible through the recess 4. Moreover, with a conductive element 5 filling both holes in the frontal and rear layers 1, 2 and the recess 4, robustness of electrical contact is greatly improved. Therefore, reliable electrical contact between pins 7 and the heating element 3 is obtained.

In the second embodiment, the method is very similar.

In this case, the conductive elements 5 are formed by a flat base and a protruding member, and they are placed and fixed on the heating element 3 by ultrasonic welding or any other suitable means. The wires are wrapped over the base, around the protruding member, in such a way that electrical contact is robustly guaranteed.

Even though reference has been made to a specific embodiment of the invention, it is obvious for a person skilled in the art that the radome described herein is susceptible to numerous variations and modifications, and that all of the details mentioned can be substituted for other technically equivalent ones without departing from the scope of protection defined by the attached claims.

The invention claimed is:

1. Radome for vehicles, comprising a frontal layer (1) and a rear layer (2), both made from thermoplastic material, the radome also comprising a heating element (3) placed on the frontal layer (1), on its face opposed to the rear layer (2), the heating element (3) being a foil with conductive wires, characterized in that the radome comprises at least one conductive element (5) that is connected with the conductive wires of said foil, and wherein the at least one conductive element (5) is placed in a recess (4) made in the heating element (3).

2. Radome for vehicles according to claim 1, wherein the conductive wires are embedded in said foil.

3. Radome for vehicles according to claim 1, wherein the rear layer (2) comprises a case (6) for a connector.

4. Radome for vehicles according to claim 3, wherein said case (6) comprises a hole for placing a conductive pin (7).

5. Radome for vehicles according to claim 1, wherein the at least one conductive element (5) is a pad or a base.

6. Radome for vehicles according to claim 1, wherein both frontal and rear layers (1, 2) have indentations and protrusions complementary to each other.

7. Radome for vehicles according to claim 1, wherein at least one of the frontal layer (1) or the rear layer (2) comprises a solderable track placed along the entire layer periphery.

8. Radome for vehicles according to claim 1, wherein the frontal layer (1) and/or the rear layer (2) also comprises a solderable track placed circling the recess (4) for said conductive element (5).

9. Method for manufacturing a radome for vehicles according to claim 1, the method comprising the following steps:
   forming the frontal layer (1) with the heating element (3) placed on a face of the frontal layer (1);
   placing the at least one conductive element(s) (5) in the heating element (3);
   forming the rear layer (2);
   assembling the frontal and rear layers (1, 2), so that the heating element (3) is on the face of the frontal layer (1) opposite to the rear layer (2), characterized in that the heating element (3) is the foil with conductive wires, wherein the radome comprises at least one conductive element (5) that is connected with the conductive wires of said foil, and wherein the at least one conductive element (5) is placed in the recess (4) made in the heating element (3).

10. Method according to claim 9, further comprising placing a conductive pin (7) in said rear layer (2) before assembly the frontal and rear layers (1, 2).

11. Method according to claim 9, further comprising placing solderable tracks in said frontal and/or rear layers (1, 2).

12. Method according to claim 9, wherein the at least one conductive element (5) in the frontal layer (1) is made by welding.

* * * * *